(12) United States Patent
Zhang (10) Patent No.: US 12,538,221 B2
(45) Date of Patent: Jan. 27, 2026

(54) ASSISTANCE INFORMATION PROCESSING METHOD, ASSISTANCE INFORMATION SENDING METHOD, AND RELATED DEVICE

(71) Applicant: VIVO MOBILE COMMUNICATION CO., LTD., Guangdong (CN)

(72) Inventor: Yanxia Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 446 days.

(21) Appl. No.: 18/148,537

(22) Filed: Dec. 30, 2022

(65) Prior Publication Data

US 2023/0134087 A1 May 4, 2023

Related U.S. Application Data

(63) Continuation of application No. PCT/CN2021/105405, filed on Jul. 9, 2021.

(30) Foreign Application Priority Data

Jul. 9, 2020 (CN) .......................... 202010658663.8

(51) Int. Cl.
*H04W 48/18* (2009.01)
(52) U.S. Cl.
CPC .................... *H04W 48/18* (2013.01)
(58) Field of Classification Search
CPC ........................................................ H04W 48/18
See application file for complete search history.

(56) References Cited

U.S. PATENT DOCUMENTS

2013/0077513 A1 * 3/2013 Ng ................ H04L 1/0026
370/254
2021/0153046 A1 5/2021 Xu et al.

FOREIGN PATENT DOCUMENTS

| CN | 112584445 A | 3/2021 | |
| CN | 112788621 A | 5/2021 | |
| WO | WO-2010109302 A1 * | 9/2010 | ........... H04W 48/08 |
| WO | 2019241969 A1 | 12/2019 | |
| WO | 2020029812 A1 | 2/2020 | |
| WO | 2021057332 A1 | 4/2021 | |

OTHER PUBLICATIONS

CATT, Open Issues for Cell Selection and Reselection of NPN cell, Discussion and Decision, 3GPP TSG-RAN WG2 Meeting #108, R2-1914439, Nov. 18-22, 2019, Reno, USA.

(Continued)

*Primary Examiner* — Brenda H Pham
(74) *Attorney, Agent, or Firm* — Price Heneveld LLP (57) ABSTRACT

This application discloses an assistance information processing method, an assistance information sending method, and a related device, and pertains to the field of communication technologies. The method includes: receiving physical cell identifier PCI range information, where the PCI range information includes a PCI range and network information corresponding to the PCI range; and determining, based on the network information, a network corresponding to the PCI range; where the network information includes a network index or a network identifier.

20 Claims, 4 Drawing Sheets

(56) References Cited

OTHER PUBLICATIONS

CMCC, Signalling Design on the PCI Range for NPN, Discussion and Decision, 3GPP TSG-RAN WG2 Meeting #109, R2-2001423, Feb. 24-28, 2020, Athens, GR.
Qualcomm, Summary of [PRN] Cell Selection and selection, Private Network Support for NG-RAN, Discussion, 3GPP TSG-RAN WG2 Meeting #109 electronic, R2-2001676, Feb. 24-Mar. 6, 2020.
Nokia (Rapporteur), Report from email discussion [AT110e][104][PRN] RRC CR (Nokia)—2nd round, NG_RAN_PRN—Core—Release 16, Discussion and Decision, 3GPP TSG-RAN WG2 Meeting #110e, R2-2005804, Jun. 1-12, 2020.
CATT, Idle and Inactive Open Issues for NPN, 3GPP TSG RAN WG2#109-e, R2-2000004, Electronic meeting, Feb. 24-Mar. 6, 2020.

* cited by examiner

ASSISTANCE INFORMATION PROCESSING METHOD, ASSISTANCE INFORMATION SENDING METHOD, AND RELATED DEVICE

CROSS-REFERENCE TO RELATED APPLICATIONS

This application is a continuation application of PCT International Application No. PCT/CN2021/105405 filed on Jul. 9, 2021, which claims priority to Chinese Patent Application No. 202010658663.8, filed on Jul. 9, 2020 in China, both of which are incorporated herein by reference in its entirety.

TECHNICAL FIELD

This application relates to the field of communication technologies, and in particular, to an assistance information processing method, an assistance information sending method, and a related device.

BACKGROUND

In communication systems, for public network integrated NPN (Public network integrated non-public network, PNI-NPN) deployment, a concept of closed access group (CAG) is introduced, so as to control UE to access a specified cell. Currently, when performing cell measurements, a terminal generally measures networks of all cells found, leading to large electrical energy consumption of the terminal.

SUMMARY

According to a first aspect, an assistance information processing method is provided, applied to a terminal and including:
  receiving physical cell identifier PCI range information, where the PCI range information includes a PCI range and network information corresponding to the PCI range; and
  determining, based on the network information, a network corresponding to the PCI range; where
  the network information includes a network index or a network identifier.

According to a second aspect, an assistance information sending method is provided, applied to a network-side device and including:
  sending physical cell identifier PCI range information, where
  the PCI range information includes a PCI range and network information corresponding to the PCI range, where the network information is used for determining a network corresponding to the PCI range, and the network information includes a network index or a network identifier.

According to a third aspect, an assistance information processing apparatus is provided, including:
  a receiving module, configured to receive physical cell identifier PCI range information, where the PCI range information includes a PCI range and network information corresponding to the PCI range; and
  a determining module, configured to determine, based on the network information, a network corresponding to the PCI range; where
  the network information includes a network index or a network identifier.

According to a fourth aspect, an assistance information sending apparatus is provided, including:
  a sending module, configured to send physical cell identifier PCI range information, where
  the PCI range information includes a PCI range and network information corresponding to the PCI range, where the network information is used for determining a network corresponding to the PCI range, and the network information includes a network index or a network identifier.

According to a fifth aspect, a terminal is provided, where the terminal includes a processor, a memory, and a program or instructions stored in the memory and capable of running on the processor, and when the program or instructions are executed by the processor, the steps of the method according to the first aspect are implemented.

According to a sixth aspect, a network-side device is provided, where the network-side device includes a processor, a memory, and a program or instructions stored in the memory and capable of running on the processor, and when the program or instructions are executed by the processor, the steps of the method according to the second aspect are implemented.

According to a seventh aspect, a readable storage medium is provided, where the readable storage medium stores a program or instructions, and when the program or instructions are executed by a processor, the steps of the method according to the first aspect are implemented, or the steps of the method according to the second aspect are implemented.

According to an eighth aspect, a chip is provided, where the chip includes a processor and a communication interface, the communication interface is coupled to the processor, and the processor is configured to run a program or instructions of a network-side device to implement the method according to the second aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that data used in this way is used interchangeably in appropriate circumstances so that the embodiments of this application can be implemented in other orders than the order illustrated or described herein. In addition, objects distinguish by "first" and "second" are usually of a same type, and the number of such objects are not limited. For example, a first object may be one object or a plurality of objects. In addition, in this specification and claims, "and/or" represents at least one of connected objects, and the character "/" generally represents an "or" relationship between the associated objects.

It should be noted that the technologies described in the embodiments of this application are not limited to long term evolution (LTE)/LTE-advanced (LTE-A) systems, and may also be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are often used interchangeably in the embodiments of this application. The technologies described may be used in the above-mentioned systems and radio technologies as well as other systems and radio technologies. However, in the following descriptions, a new radio (NR) system is described for an illustration purpose, and NR terms are used in most of the following descriptions, although these technologies may also be applied to other applications than an NR system application, for example, a 6th generation (6G) communication system.

Figure 1:
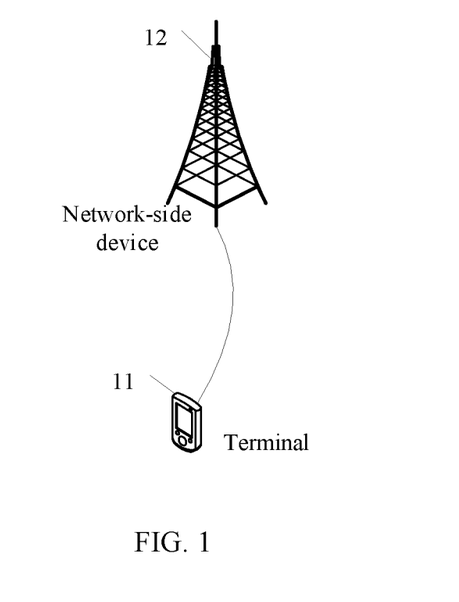
FIG. 1 is a structural diagram of a network system to which the embodiments of this application are applicable.

FIG. 1 is a block diagram of a wireless communication system to which the embodiments of this application are applicable. The wireless communication system includes a terminal 11 and a network-side device 12. The terminal 11 may also be referred to as a terminal device or user equipment (UE). The terminal 11 may be a terminal-side device such as a mobile phone, a tablet personal computer, a laptop computer or referred to as a notebook computer, a personal digital assistant (PDA), a palmtop computer, a netbook, an ultra-mobile personal computer (UMPC), a mobile internet device (MID), a wearable device, or vehicle user equipment (VUE), or pedestrian user equipment (PUE). The wearable device includes a bracelet, a headset, a pair of glasses, and the like. It should be noted that a specific type of the terminal 11 is not limited in the embodiments of this application. The network-side device 12 may be a base station or a core network. The base station may be referred to as a Node B, an evolved Node B (eNB), an access point, a base transceiver station (BTS), a radio base station, a radio transceiver, a basic service set (BSS), an extended service set (ESS), a home NodeB, a home evolved NodeB, a WLAN access point, a Wi-Fi node, a transmitting receiving point (TRP), or another appropriate term in the art. Provided that a same technical effect is achieved, the base station is not limited to any specific technical term. It should be noted that in the embodiments of this application, the base station in the NR system is merely used as an example, and a specific type of the base station is not limited.

For ease of understanding, the following describes some content included in the embodiments of the present application.

1. Non-Public Network (NPN)

In an industrial environment, for example, in manufacturing, automation control and a lot of other application have high performance requirements, such as low latency and high reliability. In local networks, with increase of device densities, it is difficult to satisfy these performance requirements. However, wireless links can be used to replace traditional wired links for providing local area network (LAN) type private communication services for such vertical industries through 5G communication networks, so as to meet communication requirements of vertical industries.

It is agreed in 3GPP that the following two NPN deployment manners are used to support communication application in vertical industries.

The first manner is standalone NPN (standalone NPN, SNPN for short) deployment. This manner does not rely on a public network, but uses a non-public network identifier (such as an SNPN ID) provided on a network side to help a terminal (User Equipment, UE) determine whether the terminal can camp on a network. For example, conventional UE cannot camp normally on a cell corresponding to an SNPN, and SNPN UE cannot camp normally on a cell corresponding to a public land mobile network (PLMN), where the conventional UE may be understood as, for example, UE that does not support SNPN access. UE capable of SNPN access may work in an SNPN mode, and may also work in a PLMN mode. When working in the SNPN mode, the UE can access a network only through the SNPN. When working in the PLMN mode, the UE can access a network only through the PLMN.

The second manner is public network integrated NPN (Public network integrated NPN, PNI-NPN for short) deployment, which relies on a public network. A concept of closed access group (CAG) is introduced in this deployment scenario, so as to control UE to access a specified cell. In a case of subscribing to an NPN service, UE indicates a CAG to which the UE belongs, and a cell provides a CAG identifier supported by the cell for the UE to determine whether the UE can access this cell. In a case that an access group to which the UE belongs is CAG1, and that access groups supported by a cell are CAG1 and CAG2, the UE can determine that the cell is accessible. In a case that the only access group supported by a cell is CAG2, the UE can determine that the cell is not accessible.

2. PLMN Index (PLMN Index)

In new radio (NR), a system message (such as SIB1) of a cell provides information about one or more networks (the network may be identified using a PLMN ID) to which the cell belongs, that is, providing a PLMN ID list (PLMN list). Each network (PLMN ID) corresponds to a PLMN index. For example, a PLMN list provided by a network side is {(PLMN A, PLMN B), (PLMN C, PLMN D)}, where (PLMN A, PLMN B) is a first entry (entry) in this PLMN list, (PLMN C, PLMN D) is a second entry in this PLMN list, and PLMN D is a second element in the second entry in this PLMN list, and therefore a PLMN index corresponding to PLMN D is 2+2=4.

The following specifically describes the assistance information processing method provided in the embodiments of this application through specific embodiments and application scenarios thereof with reference to the accompanying drawings.

Figure 2:
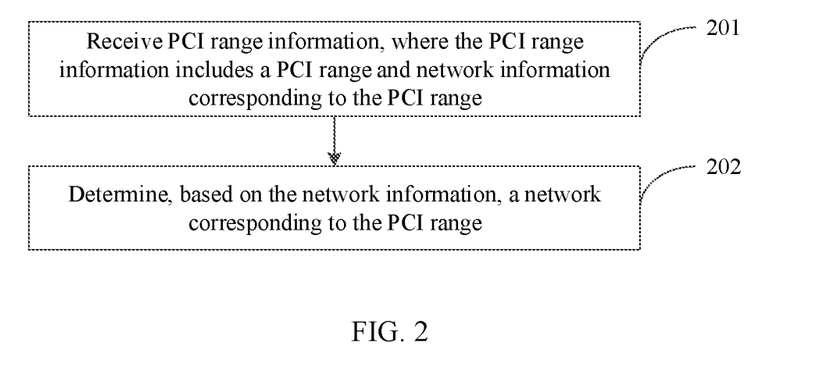
FIG. 2 is a flowchart of an assistance information processing method according to an embodiment of this application.

Refer to FIG. 2. FIG. 2 is a flowchart of an assistance information processing method according to an embodiment of this application. The method is applied to a terminal. As shown in FIG. 2, the method includes the following steps.

Step 201. Receive physical cell identifier (PCI) range information, where the PCI range information includes a PCI range and network information corresponding to the PCI range.

Step 202. Determine, based on the network information, a network corresponding to the PCI range.

The network information includes a network index or a network identifier.

In this embodiment of this application, a network-side device may provide PCI range information to the terminal by unicast or broadcast, and the PCI range information may be understood as assistance information. For example, the network-side device may provide PCI range information by using an inter-frequency closed access group cell list Inter-FreqCAG-CellList. The network information may be a network index, or may be a network identifier.

The PCI range information may be understood as reserved PCI range information, and the PCI range may be understood as a reserved PCI range. Specifically, the PCI range is a physical cell identifier range of a cell that can provide CAG access. For example, for a user who can access only a CAG cell, only a cell corresponding to the PCI range may be measured during measurement, so that power consumption can be reduced. The network corresponding to the PCI range may be understood as a network to which the PCI range belongs. For example, during deployment of a network PLMN1, cells with PCI=[1,10] are reserved or deployed as cells that can provide CAG access; and during deployment of a network PLMN2, cells with PCI=[15,20] are reserved or deployed as cells that can provide CAG access. In addition, it should be noted that one network may reserve a plurality of PCI ranges. For example, during deployment of the network PLMN1, cells with PCI=[1,10] and PCI=[20,25] are reserved or deployed as cells that can provide CAG access.

Optionally, after receiving the PCI range information, the terminal can obtain, from the PCI range information, the PCI range and the network information corresponding to the PCI range, and then determine the network corresponding to the PCI range. In this way, the terminal can perform operations such as measurement on a specified cell based on the PCI range and the network information corresponding to the PCI range.

In this embodiment of this application, the physical cell identifier PCI range information is received, where the PCI range information includes the PCI range and the network information corresponding to the PCI range; and the network corresponding to the PCI range is determined based on the network information; where the network information includes the network index or the network identifier. In this way, the terminal can perform operations such as measurement on a specified cell based on the PCI range and the network information corresponding to the PCI range, thereby reducing measurement requirements of the terminal. This embodiment of this application reduces power consumption of the terminal.

It should be understood that the manner for determining the network corresponding to the PCI range varies with different network information.

Optionally, in an embodiment, the determining, based on the network information, a network corresponding to the PCI range includes at least one of the following:

in a case that the network information includes the network index, determining, based on a network identifier list of a reference cell and the network index, the network corresponding to the PCI range; or in a case that the network information includes the network identifier, determining, based on the network identifier, the network corresponding to the PCI range.

In this embodiment, when the network information is the network identifier, the network corresponding to the PCI range can be directly determined based on the network identifier; or when the network information is the network index, the network corresponding to the PCI range can be determined based on a network identifier list of a reference cell and the network index.

In this embodiment of this application, in a case that the network corresponding to the PCI range is indicated by the network index, the reference cell may be understood as a reference cell corresponding to the network index. When working in a carrier aggregation (CA) mode or a dual-connectivity (DC) mode, UE has a plurality of serving cells, and specified PLMN indexes of different serving cells may correspond to different PLMNs. For example, the UE has two serving cells, a PLMN index 3 of serving cell 1 corresponds to PLMN A, and a PLMN index 3 of serving cell 2 corresponds to PLMN B. Therefore, when the UE receives a network indication, and network information carried in the PCI range information is PLMN index 3, the UE cannot determine whether the network corresponding to the PCI range is PLMN A or PLMN B. In a case that the PLMN index lacks information about a corresponding reference cell (that is, a cell corresponding to the PLMN index), the UE and the network may have inconsistent understanding on the parameter in the PCI range information, making the UE fail to correctly use the parameter provided by the network side to reduce power consumption. In the present application, a reference cell corresponding to the network index has been defined, which can ensure that the UE and network-side device have consistent understanding on the PCI range information, so that the terminal can correctly use the PCI range information provided by the network-side device to reduce electrical energy consumption.

It should be noted that, in an embodiment, it may be agreed that the network-side device sends only PCI range information corresponding to a network supported by a reference cell, and in this case, when the network side provides PCI range information, a network corresponding to the PCI range may be indicated by a network index, with small signaling overheads; and it may also be agreed that the network-side device may send PCI range information corresponding to a network not supported by a reference cell, and in this case, when the network side provides PCI range information, a network corresponding to the PCI range may be indicated by a network identifier. This manner is more flexible. The reason lies in that: also assuming that the reference cell supports very few networks (or there are very few networks sharing the reference cell), for example, supporting only one network, if the network side provides only PCI range information corresponding to the network supported by the reference cell, the UE side can obtain less assistance information, which cannot implement a good effect of power consumption; however, if the network side can also provide PCI range information corresponding to a network not supported by the reference cell, the UE side can obtain more assistance information, which is more conducive to reducing power consumption. When the network side provides PCI range corresponding to a network not supported by the reference cell, the network corresponding to the PCI range need to be indicated by a network identifier. As compared with using a network index, signaling overheads are relatively large, but when providing PCI range information, the network side can balance signaling overheads and UE power consumption through flexible control. The PCI range information corresponding to a network supported by a reference cell may be understood as that a network corresponding to network information in the PCI range information is a network supported by the reference cell; and the PCI range information corresponding to a network not supported by a reference cell may be understood as that a network corresponding to network information in the PCI range information is a network not supported by the reference cell. For a case that a network corresponding to network information in the PCI range information is a network not supported by the reference cell, a network index may be used for indication, or a network identifier may be used for indication.

For example, in an embodiment, all network information indicated by the network can be indicated using the network index. In a case that a network corresponding to the network index is a network not supported by the reference cell, the terminal cannot determine the network corresponding to the network information. In other words, the terminal can determine that the network corresponding to the PCI range is a network not supported by the reference cell. In this case, behaviors of the terminal may include: ignoring or discarding or not storing PCI range information currently received. That is, in this embodiment, in a case that the network corresponding to the network index is a network not supported by the reference cell, the PCI range information is ignored or discarded or not stored. In this embodiment of this application, the network corresponding to the PCI range information is indicated using the network index, which can reduce overheads occupied by the network information.

In another embodiment, a network supported by the reference cell may be indicated using a network index; and a network not supported by the reference cell may be indicated using a network identifier. That is, in a case that the network corresponding to the PCI range is a network not supported by the reference cell, the network information includes the network identifier; and in a case that the network corresponding to the PCI range is a network supported by the reference cell, the network information includes the network index. In this embodiment of this application, in a case that the network corresponding to the PCI range is a network not supported by the reference cell, the network identifier is used for indication, which can ensure that the terminal correctly understands the PCI range information indicated by the network.

Optionally, in an embodiment, the reference cell may be prescribed by a protocol or configured by a network-side device.

Optionally, a protocol prescribes the reference cell in any one of the following manners:
  a cell receiving the PCI range information is the reference cell;
  a cell of a preset type is the reference cell; or
  a cell of a preset identifier is the reference cell.

In other words, the reference cell is prescribed by a protocol or configured by a network-side device. In a case that the reference cell is prescribed by a protocol, the reference cell is any one of the following:
  a cell receiving the PCI range information;
  a cell of a preset type; or
  a cell of a preset identifier.

For a case that a protocol prescribes that a cell receiving the PCI range information is the reference cell, the network-side device may determine that a cell sending the PCI range information is the reference cell, where the cell in which the terminal receives the PCI range information and the cell in which the network-side device sends the PCI range information should be the same cell. For example, the UE receives the PCI range information through cell 1. In a case that the network information carried in the PCI range information is a network index PLMN index=2, and that a PLMN list supported by cell 1 is {(PLMN A, PLMN B), (PLMN C, PLMN D)}, the UE determines that the network corresponding to the PCI range carried in the PCI range information received is PLMN B. In a case that the network information carried in the PCI range information is a network identifier, the UE determines that the network corresponding to the PCI range carried in the PCI range information received is a network corresponding to the network identifier.

For a case that a protocol prescribes that a cell of a preset type is the reference cell, the preset type may be primary cell (PCell) or primary secondary cell (PSCell). For example, a protocol prescribes that a primary cell (such as PCell) is the reference cell of the network corresponding to the PCI range, a PLMN list supported by the primary cell is {(PLMN A, PLMN B), (PLMN C, PLMN D)}, and the UE receives the PCI range information through cell 1. In a case that the network index PLMN index=2 is carried in the PCI range information, the UE takes the primary cell as the reference cell corresponding to the network information (PLMN index) and determines that the network corresponding to the PCI range received is PLMN B; where cell 1 may be a non-primary cell or a primary cell. In a case that the network information carried in the PCI range information is a network identifier PLMN E, the UE determines that the network corresponding to the PCI range received is a network corresponding to the network identifier PLMN E.

For a case that a cell of a preset identifier is the reference cell, an identifier type of the preset identifier includes cell identity (Cell ID), physical cell identifier, or cell global identifier (CGI). For example, a cell protocol prescribes that a cell corresponding to a cell ID=0 is the reference cell of the network corresponding to the PCI range, a PLMN list supported by the cell with the cell ID=0 is {(PLMN A, PLMN B), (PLMN C, PLMN D)}, and the UE receives the PCI range information through cell 1. In a case that a network index PLMN index=2 is carried in the PCI range information, the UE takes the cell with the cell ID=0 as the reference cell of the network information (PLMN index) and determines that the network corresponding to the PCI range received is PLMN B; where cell 1 may be a cell with the cell ID equal to 0 or not equal to 0. In a case that the network information carried in the PCI range information is a network identifier PLMN E, the UE determines that the network corresponding to the PCI range received is a network corresponding to the network identifier PLMN E.

Optionally, in a case that the reference cell is configured by a network-side device, the reference cell may be indicated by the PCI range information, that is, the PCI range information further includes cell indication information, and the cell indication information is used for indicating the reference cell.

Optionally, the cell indication information includes any one of the following:
  cell identity information, for example, a cell ID;
  physical cell identifier information, for example, a PCI;
  cell global identifier information, for example, a CGI; or
  cell type identifier information, for example, a PCell or a PSCell.

For better understanding of this application, the following describes an implementation process of this application in detail by using specific embodiments.

Embodiment 1: A network-side device indicates a network corresponding to a PCI range by using a network index (a PLMN index), and a reference cell corresponding to the network index is prescribed by a protocol.

Specifically, the network-side device and a terminal may have the following behaviors.

The network-side device may provide PCI range information to UE by unicast or broadcast, where the PCI range information includes a PCI range and corresponding network information (indicated by a network index), and a reference cell corresponding to the network index is prescribed by a protocol. The protocol prescription manner may be any one of the following.

Manner 1: A protocol prescribes that a cell sending the PCI range information is a reference cell of a network corresponding to the PCI range. For example, the network corresponding to the PCI range provided by the network-side device is PLMN B, a PLMN list supported by cell 1 is {(PLMN A, PLMN B), (PLMN C, PLMN D)}, and the network-side device provides the PCI range information through cell 1. In this case, the network information in the PCI range information is set as PLMN index=2 before the PCI range information is provided.

Manner 2: A protocol prescribes that a cell of a specified type is the reference cell of the network corresponding to the PCI range, and the cell of the specified type may be a primary cell or a primary secondary cell. For example, the protocol prescribes that a primary cell is the reference cell of the network, the network corresponding to the PCI range provided by the network-side device is PLMN B, a PLMN list supported by the primary cell is {(PLMN A, PLMN B), (PLMN C, PLMN D)}, and the network-side device provides the PCI range information through cell 1. In this case, the network information in the PCI range information is set as PLMN index=2 before the PCI range information is provided; where cell 1 may be a primary cell or not a primary cell.

Manner 3: A protocol prescribes that a cell corresponding to a specified cell identity is the reference cell of the network corresponding to the PCI range, and the specified cell identifier may be a cell identity (such as a cell ID), a physical cell identifier (such as a PCI), or a cell global identifier (such as a CGI). For example, a cell protocol prescribes that a cell corresponding to a cell ID=0 is the reference cell of the network corresponding to the PCI range, the network corresponding to the PCI range provided by the network-side device is PLMN B, a PLMN list supported by the cell with the cell ID=0 is {(PLMN A, PLMN B), (PLMN C, PLMN D)}, and the network-side device provides the PCI range information through cell 1. In this case, the network information in the PCI range information is set as PLMN index=2 before the PCI range information is provided; where cell 1 may be a cell with the cell ID equal to 0 or not equal to 0.

Optionally, the network-side device does not provide PCI range information corresponding to a network not supported by the reference cell, or the network-side device provides only PCI range information corresponding to a network supported by the reference cell. For example, a protocol prescribes that a cell sending the PCI range information is the reference cell of the network corresponding to the PCI range information. For example, a PLMN list supported by cell 1 is {(PLMN A, PLMN B), (PLMN C, PLMN D)}. When the network-side device provides the PCI range information through cell 1, the network-side device provides only PCI range information corresponding to PLMN A/B/C/D, or the network-side device does not provide PCI range information not corresponding to PLMN A/B/C/D. For other protocol prescription manners, a processing method is similar, which is not described herein.

The UE receives the PCI range information provided by the network-side device and determines the network corresponding to the PCI range. Determining manners of the UE are as follows.

With respect to the foregoing Manner 1, if a protocol prescribes that a cell receiving the PCI range information is the reference cell of the network corresponding to the PCI range information, the UE determines, based on a network index carried in the PCI range information and a network identifier list of the reference cell, the network corresponding to the PCI range. For example, the UE receives the PCI range information through cell 1, where a network index PLMN index=2 is carried in the PCI range information, and a PLMN list supported by cell 1 is {(PLMN A, PLMN B), (PLMN C, PLMN D)}, and the UE determines that the network corresponding to the PCI range received is PLMN B.

With respect to the foregoing Manner 2, if a protocol prescribes that a cell of a specified type is the reference cell of the network corresponding to the PCI range information, the UE determines, based on a network index carried in the PCI range information and a network identifier list of the cell of the specified type, the network corresponding to the PCI range. For example, the protocol prescribes that a primary cell is the reference cell of the network corresponding to the PCI range information, a PLMN list supported by the primary cell is {(PLMN A, PLMN B), (PLMN C, PLMN D)}, the UE receives the PCI range information through cell 1, and a network index PLMN index=2 is carried in the PCI range information. The UE takes the primary cell as the reference cell of the network information (a PLMN index) and determines that the network corresponding to the PCI range received is PLMN B; where cell 1 may be a non-primary cell or a primary cell.

With respect to the foregoing Manner 3, if a protocol prescribes that a cell corresponding to a specified cell identity is the reference cell of the network corresponding to the PCI range, the UE determines, based on a network index carried in the PCI range information and a network identifier list of the cell corresponding to the specified cell identity, the network corresponding to the PCI range. For example, a cell protocol prescribes that a cell corresponding to a cell ID=0 is the reference cell of the network, a PLMN list supported by the cell with the cell ID=0 is {(PLMN A, PLMN B), (PLMN C, PLMN D)}, the UE receives the PCI range information through cell 1, and a network index PLMN index=2 is carried in the PCI range information. The UE takes the cell corresponding to that the cell ID=0 as the reference cell corresponding to the network information (a PLMN index) and determines that the network corresponding to the PCI range received is PLMN B. Cell 1 may be a cell with the cell ID equal to 0 or not equal to 0.

Optionally, in a case that the UE receives PCI range information that has no correspondence with the network supported by the reference cell, the UE ignores the PCI range information, or discards or does not store the PCI range information. For example, a protocol prescribes that a cell sending the PCI range information is the reference cell of the network corresponding to the PCI range information. For example, a PLMN list supported by cell 1 is {(PLMN A, PLMN B), (PLMN C, PLMN D)}, the network-side device provides the PCI range information through cell 1, and the network information PLMN index=5 is carried in the PCI range information received by the UE. Because a PLMN index corresponding to a network supported by cell 1 is 1-4, the UE ignores the PCI range information corresponding to the PLMN index, or discards or does not store the PCI range information corresponding to the PLMN index. For other protocol prescription manners, a processing method is similar, which is not described herein.

Embodiment 2: A reference cell corresponding to a PLMN index is prescribed by a protocol, and PCI range information corresponding to a network not supported by the reference cell may be provided. Specifically, a network-side device and a terminal may have the following behaviors.

The network-side device may provide PCI range information to UE by unicast or broadcast, where the PCI range information includes a PCI range and corresponding network information that is indicated by a network index (such as a PLMN index) or a network identifier (a PLMN ID), and a reference cell corresponding to the network index is prescribed by a protocol. The protocol prescription manner may be any one of the following.

Manner 1: A protocol prescribes that a cell sending the PCI range information is a reference cell of a network corresponding to the PCI range information.

Manner 2: A protocol prescribes that a cell of a specified type is the reference cell of the network corresponding to the PCI range, and the cell of the specified type may be a primary cell or a primary secondary cell.

Manner 3: A protocol prescribes that a cell corresponding to a specified cell identity is the reference cell of the network corresponding to the PCI range.

The network-side device determines, by using the following manners, network information corresponding to the PCI range, where the network information is indicated by a network index (a PLMN index) or a network identifier (such as a PLMN ID).

In a case that the network corresponding to the PCI range is a network supported by the reference cell prescribed by the protocol, it is determined that the network information is indicated by the network index (a PLMN index). For example, in a case that the protocol prescribes that a primary cell is the reference cell of the network corresponding to the PCI range, and that a PLMN list supported by the primary cell is {(PLMN A, PLMN B), (PLMN C, PLMN D)}, if the network corresponding to the PCI range is PLMN A, it is determined that the network information carried in the PCI range information is PLMN index=1. For other cases of the reference cell being prescribed by the protocol, a processing behavior of the network side is the same, which is not described herein again.

In a case that the network corresponding to the PCI range is a network not supported by the reference cell prescribed by the protocol, it is determined that the network information is indicated by the network identifier (a PLMN ID). For example, in a case that the protocol prescribes that a primary cell is the reference cell of the network corresponding to the PCI range, and that a PLMN list supported by the primary cell is {(PLMN A, PLMN B), (PLMN C, PLMN D)}, if the network corresponding to the PCI range is PLMN E, it is determined that the network information carried in the PCI range information is PLMN E. For other cases of the reference cell being prescribed by the protocol, a processing behavior of the network side is the same, which is not described herein again.

The UE receives the PCI range information provided by the network-side device and determines the network corresponding to the PCI range. Determining manners of the UE are as follows.

With respect to the foregoing Manner 1, if a protocol prescribes that a cell receiving the PCI range information is the reference cell of the network corresponding to the PCI range information, the UE determines, based on the network information carried in the PCI range information and a network identifier list of the reference cell, the network corresponding to the PCI range. For example, the UE receives the PCI range information through cell 1. If the network information carried in the PCI range information is a network index PLMN index=2, and a PLMN list supported by cell 1 is {(PLMN A, PLMN B), (PLMN C, PLMN D)}, the UE determines that the network corresponding to the PCI range received is PLMN B. If the network information carried in the PCI range information is a network identifier, the UE determines that the network corresponding to the PCI range received is a network corresponding to the network identifier.

With respect to the foregoing Manner 2, if a protocol prescribes that a cell of a specified type is the reference cell of the network corresponding to the PCI range information, the UE determines, based on a network index carried in the PCI range information and a network identifier list of the cell of the specified type, the network corresponding to the PCI range. For example, the protocol prescribes that a primary cell is the reference cell of the network corresponding to the PCI range information, a PLMN list supported by the primary cell is {(PLMN A, PLMN B), (PLMN C, PLMN D)}, and the UE receives the PCI range information through cell 1. If a network index PLMN index=2 is carried in the PCI range information, the UE takes the primary cell as the reference cell of the network information (a PLMN index) and determines that the network corresponding to the PCI range received is PLMN B. If the network information carried in the PCI range information is a network identifier PLMN E, the UE determines that the network corresponding to the PCI range received is a network corresponding to the network identifier PLMN E. Cell 1 may be a non-primary cell or a primary cell.

With respect to the foregoing Manner 3, if a protocol prescribes that a cell corresponding to a specified cell identity is the reference cell of the network corresponding to the PCI range, the UE determines, based on a network index carried in the PCI range information and a network identifier list of the cell corresponding to the specified cell identity, the network corresponding to the PCI range. For example, a cell protocol prescribes that a cell corresponding to a cell ID=0 is the reference cell of the network, a PLMN list supported by the cell with the cell ID=0 is {(PLMN A, PLMN B), (PLMN C, PLMN D)}, and the UE receives the PCI range information through cell 1. If a network index PLMN index=2 is carried in the PCI range information, the UE takes the cell corresponding to the cell ID=0 as the reference cell corresponding to the network information (a PLMN index) and determines that the network corresponding to the PCI range received is PLMN B. If the network information carried in the PCI range information is a network identifier PLMN E, the UE determines that the network corresponding to the PCI range received is a network corresponding to the network identifier PLMN E.

Embodiment 3: A network-side device indicates a reference cell corresponding to a PLMN index, and provides only PCI range information corresponding to a network supported by the reference cell. Specifically, the network-side device and a terminal may have the following behaviors.

The network-side device may provide PCI range information to UE by unicast or broadcast, where the PCI range information includes a PCI range, a corresponding network index, and reference cell information corresponding to the network index. The reference cell information corresponding to the network index may be any one of the following:
cell identity information, for example, a cell ID;
physical cell identifier information, for example, a PCI;
cell global identifier information, for example, a CGI; or
cell type identifier information, for example, a PCell or a PSCell.

Optionally, the network-side device does not provide PCI range information corresponding to a network not supported by the reference cell, or the network-side device provides only PCI range information corresponding to a network supported by the reference cell. For example, a protocol prescribes that a cell sending the PCI range information is the reference cell of the network corresponding to the PCI range information. For example, a PLMN list supported by cell 1 is {(PLMN A, PLMN B), (PLMN C, PLMN D)}. When the network-side device provides the PCI range information through cell 1, the network-side device provides only PCI range information corresponding to PLMN A/B/C/D, or the network-side device does not provide PCI range information not corresponding to PLMN A/B/C/D. For other protocol prescription manners, a processing method is similar, which is not described herein.

The UE receives the PCI range information provided by the network-side device and determines the network corresponding to the PCI range. Determining manners of the UE are as follows.

The UE determines, based on a network index carried in the PCI range information and a network identifier list of the reference cell indicated by a network, the network corresponding to the PCI range. For example, the UE receives the PCI range information through cell 1, where a network index PLMN index=2 and cell information cell ID=1 are carried in the PCI range information, and a PLMN list supported by a cell corresponding to the cell ID=1 is {(PLMN A, PLMN B), (PLMN C, PLMN D)}, and the UE determines that the network corresponding to the PCI range received is PLMN B.

Optionally, in a case that the UE receives PCI range information that has no correspondence with the network supported by the reference cell, the UE ignores the PCI range information, or discards or does not store the PCI range information. For example, a network index PLMN index=5 and cell information cell ID=1 are carried in the PCI range information received by the UE, and a PLMN list supported by cell 1 corresponding to the cell ID=1 is {(PLMN A, PLMN B), (PLMN C, PLMN D)}. Because a PLMN index corresponding to a network supported by cell 1 is 1-4, the UE ignores the PCI range information corresponding to the PLMN index=5, or discards or does not store the PCI range information corresponding to the PLMN index=5.

Embodiment 4: A reference cell corresponding to a PLMN index is prescribed by a protocol, and PCI range information corresponding to a network supported by the reference cell may be provided.

A network-side device may provide PCI range information to UE by unicast or broadcast, where the PCI range information includes a PCI range, corresponding network information, and reference cell information corresponding to the network information, and the network information is indicated by a network index (such as a PLMN index) or a network identifier (a PLMN ID). The reference cell information corresponding to the network index may be any one of the following:
cell identity information, for example, a cell ID;
physical cell identifier information, for example, a PCI;
cell global identifier information, for example, a CGI; or
cell type identifier information, for example, a PCell or a PSCell.

Optionally, the network-side device determines, by using the following manners, network information corresponding to the PCI range, where the network information is indicated by a network index (a PLMN index) or a network identifier (such as a PLMN ID).

In a case that the network corresponding to the PCI range is a network supported by the reference cell, it is determined that the network information is indicated by the network index (a PLMN index). For example, in a case that the protocol prescribes that a primary cell is the reference cell of the network corresponding to the PCI range, and that a PLMN list supported by the primary cell is {(PLMN A, PLMN B), (PLMN C, PLMN D)}, if the network corresponding to the PCI range is PLMN A, it is determined that the network information carried in the PCI range information is PLMN index=1. For other cases of the reference cell being prescribed by the protocol, a processing behavior of the network-side device is the same, which is not described herein again.

In a case that the network corresponding to the PCI range is a network not supported by the reference cell prescribed by the protocol, it is determined that the network information is indicated by the network identifier (a PLMN ID). For example, in a case that the protocol prescribes that a primary cell is the reference cell of the network corresponding to the PCI range, and that a PLMN list supported by the primary cell is {(PLMN A, PLMN B), (PLMN C, PLMN D)}, if the network corresponding to the PCI range is PLMN E, it is determined that the network information carried in the PCI range information is PLMN E. For other cases of the reference cell being prescribed by the protocol, a processing behavior of the network-side device is the same, which is not described herein again.

The UE receives the PCI range information provided by the network-side device and determines the network corresponding to the PCI range. Determining manners of the UE are as follows.

The UE determines, based on the network information (that is, the network index or the network identifier) carried in the PCI range information and a network identifier list of the reference cell indicated by a network, the network corresponding to the PCI range. For example, the UE receives the PCI range information through cell 1. If a network index PLMN index=2 and cell information cell ID=1 are carried in the PCI range information, and a PLMN list supported by a cell corresponding to that cell ID=1 is {(PLMN A, PLMN B), (PLMN C, PLMN D)}, the UE determines that the network corresponding to the PCI range received is PLMN B. If the network information carried in the PCI range information is a network identifier PLMN E, the UE determines that the network corresponding to the PCI range received is a network corresponding to the network identifier PLMN E.

Figure 3:
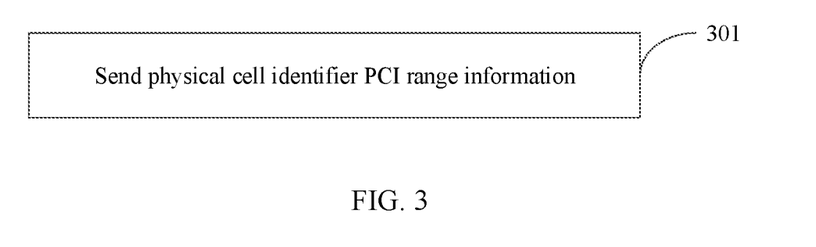
FIG. 3 is a flowchart of an assistance information sending method according to an embodiment of this application.

Referring to FIG. 3, FIG. 3 is a flowchart of an assistance information sending method according to an embodiment of this application. The method is applied to a network-side device. As shown in FIG. 3, the method includes the following step.

Step 301. Send physical cell identifier PCI range information.

The PCI range information includes a PCI range and network information corresponding to the PCI range, where the network information is used for determining a network corresponding to the PCI range, and the network information includes a network index or a network identifier.

Optionally, in a case that the network corresponding to the PCI range is a network not supported by a reference cell, the network information includes the network identifier.

Optionally, in a case that the network corresponding to the PCI range is a network supported by a reference cell, the network information includes the network index.

Optionally, the reference cell is prescribed by a protocol or determined by the network-side device.

Optionally, a protocol prescribes the reference cell in any one of the following manners:
   a cell sending the PCI range information is the reference cell;
   a cell of a preset type is the reference cell; or
   a cell of a preset identifier is the reference cell.

Optionally, the cell of the preset type is a primary cell or a primary secondary cell.

Optionally, an identifier type of the preset identifier includes cell identity, physical cell identifier, or cell global identifier.

Optionally, in a case that the reference cell is determined by the network-side device, the PCI range information further includes cell indication information, and the cell indication information is used for indicating the reference cell.

Optionally, the cell indication information includes any one of the following:
   cell identity information;
   physical cell identifier information;
   cell global identifier information; or
   cell type identifier information.

It should be noted that this embodiment serves as an implementation of the network-side device corresponding to the embodiment shown in FIG. 2. For specific implementations of this embodiment, reference may be made to related description of the embodiment shown in FIG. 2, and the same effects are achieved. To avoid repetition, details are not described herein again.

It should be noted that the assistance information processing method provided in the embodiments of this application may be performed by an assistance information processing apparatus or a control module for performing the assistance information processing method in the assistance information processing apparatus. The embodiments of this application use the assistance information processing apparatus performing the assistance information processing method as an example to describe the assistance information processing apparatus provided in the embodiments of this application.

Figure 4:
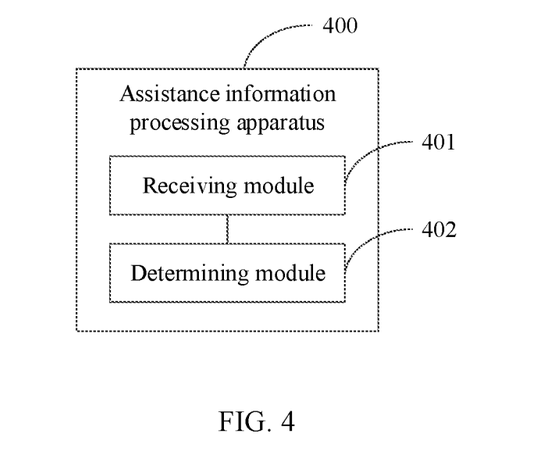
FIG. 4 is a structural diagram of an assistance information processing apparatus according to an embodiment of this application.

Referring to FIG. 4, FIG. 4 is a schematic diagram of an assistance information processing apparatus according to an embodiment of this application. As shown in FIG. 4, the assistance information processing apparatus 400 includes:
   a receiving module 401, configured to receive physical cell identifier PCI range information, where the PCI range information includes a PCI range and network information corresponding to the PCI range; and
   a determining module 402, configured to determine, based on the network information, a network corresponding to the PCI range; where
   the network information includes a network index or a network identifier.

Optionally, the determining module 402 is specifically configured to perform at least one of the following:
   in a case that the network information includes the network index, determining, based on a network identifier list of a reference cell and the network index, the network corresponding to the PCI range; or
   in a case that the network information includes the network identifier, determining, based on the network identifier, the network corresponding to the PCI range.

Optionally, the assistance information processing apparatus 400 further includes:
   a processing module, configured to: in a case that a network corresponding to the network index is a network not supported by the reference cell, ignore or discard the PCI range information.

Optionally, the reference cell is prescribed by a protocol or configured by a network-side device.

Optionally, a protocol prescribes the reference cell in any one of the following manners:
   a cell receiving the PCI range information is the reference cell;
   a cell of a preset type is the reference cell; or
   a cell of a preset identifier is the reference cell.

Optionally, the cell of the preset type is a primary cell or a primary secondary cell.

Optionally, an identifier type of the preset identifier includes cell identity, physical cell identifier, or cell global identifier.

Optionally, in a case that the reference cell is configured by a network-side device, the PCI range information further includes cell indication information, and the cell indication information is used for indicating the reference cell.

Optionally, the cell indication information includes any one of the following:
   cell identity information;
   physical cell identifier information;
   cell global identifier information; or
   cell type identifier information.

The assistance information processing apparatus provided in this embodiment of this disclosure can implement the processes in the method embodiment in FIG. 2. To avoid repetition, details are not described herein again.

It should be noted that the assistance information sending method provided in the embodiments of this application may be performed by an assistance information sending apparatus or a control module for performing the assistance information sending method in the assistance information sending apparatus. The embodiments of this application use the assistance information sending apparatus performing the assistance information sending method as an example to describe the assistance information sending apparatus provided in the embodiments of this application.

Figure 5:
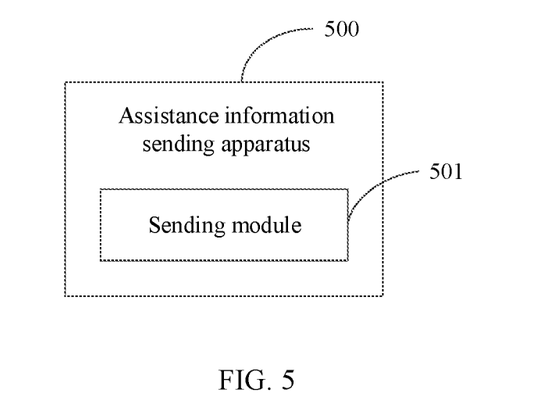
FIG. 5 is a structural diagram of an assistance information sending apparatus according to an embodiment of this application.

Referring to FIG. 5, FIG. 5 is a schematic structural diagram of an assistance information sending apparatus according to an embodiment of this application. As shown in FIG. 5, the assistance information sending apparatus 500 includes:
   a sending module 501, configured to send physical cell identifier PCI range information, where
   the PCI range information includes a PCI range and network information corresponding to the PCI range, where the network information is used for determining a network corresponding to the PCI range, and the network information includes a network index or a network identifier.

Optionally, in a case that the network corresponding to the PCI range is a network not supported by a reference cell, the network information includes the network identifier.

Optionally, in a case that the network corresponding to the PCI range is a network supported by a reference cell, the network information includes the network index.

Optionally, the reference cell is prescribed by a protocol or determined by the network-side device.

Optionally, a protocol prescribes the reference cell in any one of the following manners:
- a cell sending the PCI range information is the reference cell;
- a cell of a preset type is the reference cell; or
- a cell of a preset identifier is the reference cell.

Optionally, the cell of the preset type is a primary cell or a primary secondary cell.

Optionally, an identifier type of the preset identifier includes cell identity, physical cell identifier, or cell global identifier.

Optionally, in a case that the reference cell is determined by the network-side device, the PCI range information further includes cell indication information, and the cell indication information is used for indicating the reference cell.

Optionally, the cell indication information includes any one of the following:
- cell identity information;
- physical cell identifier information;
- cell global identifier information; or
- cell type identifier information.

The assistance information sending apparatus provided in this embodiment of this application can implement the processes in the method embodiment in FIG. 3. To avoid repetition, details are not described herein again.

The assistance information processing apparatus and the assistance information sending apparatus in the embodiments of this application may be apparatuses, or may be components, integrated circuits, or chips in a terminal. Such apparatuses may be mobile terminals, or may be non-mobile terminals. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like. This is not specifically limited in the embodiments of this application.

The assistance information processing apparatus and the assistance information sending apparatus in the embodiments of this application may be apparatuses having an operating system. The operating system may be an Android operating system, may be an iOS operating system, or may be another possible operating system. This is not specifically limited in the embodiments of this application.

The assistance information processing apparatus and the assistance information sending apparatus provided in the embodiments of this application are capable of implementing various processes that are implemented in the method embodiments of FIG. 2 and FIG. 3, with the same technical effects achieved. To avoid repetition, details are not described herein again.

Figure 6:
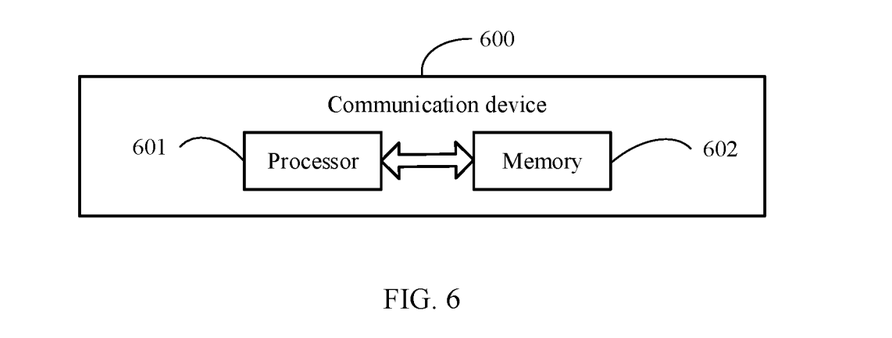
FIG. 6 is a structural diagram of a communication device according to an embodiment of this application.

Optionally, as shown in FIG. 6, an embodiment of this application further provides a communication device 600, including a processor 601, a memory 602, and a program or instructions stored in the memory 602 and capable of running on the processor 601. For example, in a case that the communication device 600 is a terminal, when the program or instructions are executed by the processor 601, the processes of the foregoing embodiments of the assistance information processing method and the assistance information sending method are implemented, with the same technical effects achieved. In a case that the communication device 600 is a network-side device, when the program or instructions are executed by the processor 601, the processes of the foregoing embodiments of the assistance information processing method and the assistance information sending method are implemented, with the same technical effects achieved. To avoid repetition, details are not described herein again.

Figure 7:
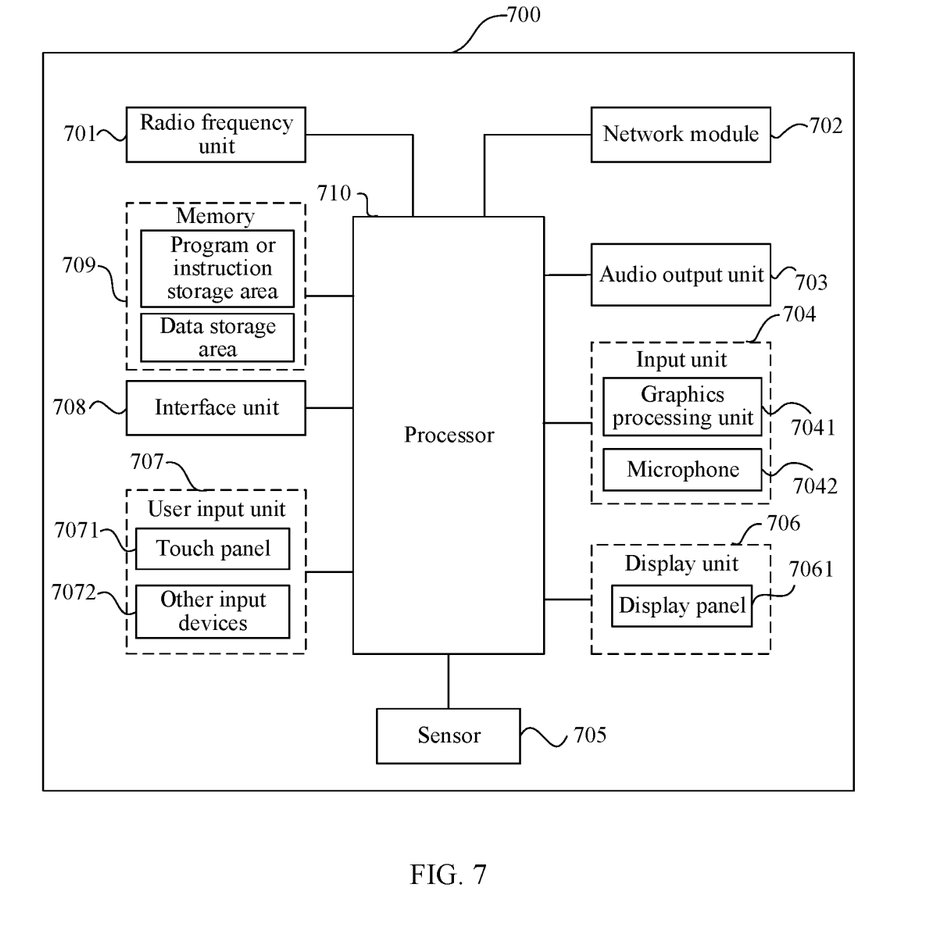
FIG. 7 is a structural diagram of a terminal according to an embodiment of this application.

FIG. 7 is a schematic diagram of a hardware structure of a terminal for implementing the embodiments of this application.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the terminal 700 may further include a power supply (such as a battery) for supplying power to the components. The power supply may be logically connected to the processor 710 through a power management system. In this way, functions such as charge management, discharge management, and power consumption management are implemented by using the power management system. The terminal structure shown in FIG. 7 does not constitute a limitation to the terminal. The terminal may include more or fewer components than shown in the figure, or a combination of some components, or components disposed differently. Details are not described herein again.

It should be understood that in this embodiment of this application, the input unit 704 may include a graphics processing unit (GPU) 7041 and a microphone 7042. The graphics processing unit 7041 processes image data of a static picture or a video that is obtained by an image capture apparatus (for example, a camera) in a video capture mode or an image capture mode. The display unit 706 may include a display panel 7061, and the display panel 7061 may be configured in a form of a liquid crystal display, an organic light-emitting diode, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a functional button (such as a volume control button or a power on/off button), a trackball, a mouse, and a joystick. Details are not described herein.

In this embodiment of this application, the radio frequency unit 701 sends downlink information received from a network-side device to the processor 710 for processing, and in addition, sends uplink data to the network-side device. Generally, the radio frequency unit 701 includes but is not limited to an antenna, at least one amplifier, a transceiver, a coupler, a low noise amplifier, and a duplexer.

The memory 709 may be configured to store software programs and various data. The memory 709 may mainly include a program or instruction storage area and a data storage area. The program or instruction storage area may store an operating system, an application program or instructions required by at least one function (for example, an audio playing function and an image playing function), and the like. In addition, the memory 709 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one magnetic disk storage device, a flash storage device, or another volatile solid-state storage device.

The processor 710 may include one or more processing units. Optionally, the processor 710 may integrate an application processor and a modem processor. The application processor mainly processes an operating system, a user interface, an application program or instructions, and the like. The modem processor mainly processes wireless communication, for example, a baseband processor. It should be understood that alternatively, the modem processor may not be integrated into the processor 710.

The radio frequency unit 701 is configured to receive physical cell identifier PCI range information, where the PCI range information includes a PCI range and network information corresponding to the PCI range.

The processor 710 determines, based on the network information, a network corresponding to the PCI range.

The network information includes a network index or a network identifier.

It should be understood that in this embodiment, the processor 710 and the radio frequency unit 701 can implement various processes that are implemented by the terminal in the method embodiment of FIG. 2. To avoid repetition, details are not described herein again.

Figure 8:
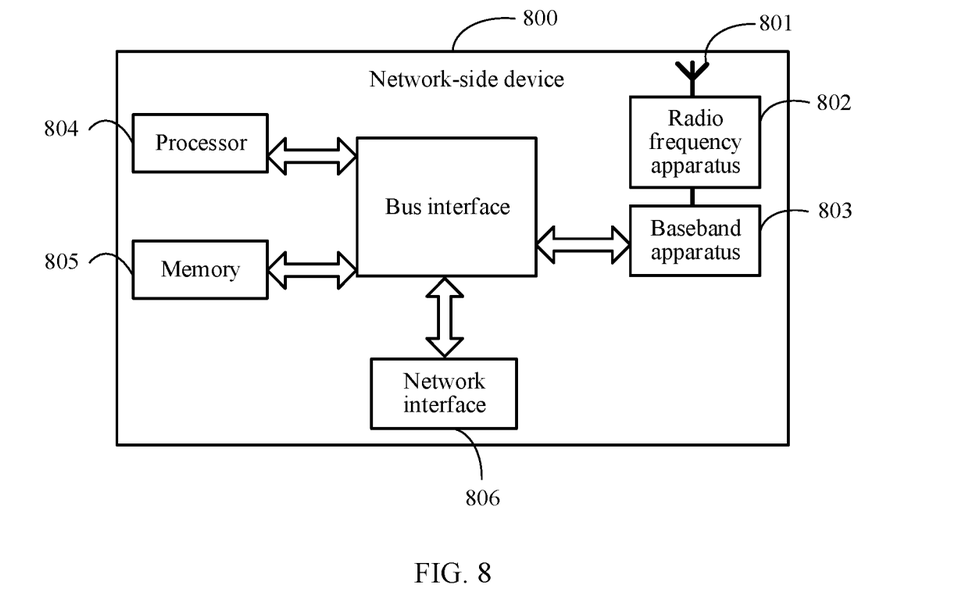
FIG. 8 is a structural diagram of a network-side device according to an embodiment of this application.

Specifically, an embodiment of this application further provides a network-side device. As shown in FIG. 8, the network-side device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and transmits the received information to the baseband apparatus 803 for processing. In a downlink direction, the baseband apparatus 803 processes to-be-transmitted information, and transmits the information to the radio frequency apparatus 802; and the radio frequency apparatus 802 processes the received information and then transmits the information by using the antenna 801.

The radio frequency apparatus 802 may be located in the baseband apparatus 803. The method performed by the network-side device in the foregoing embodiments may be implemented by the baseband apparatus 803, and the baseband apparatus 803 includes a processor 804 and a memory 805.

The baseband apparatus 803 may include, for example, at least one baseband processing unit, where a plurality of chips are disposed on the baseband processing unit. As shown in FIG. 8, one of the chips is, for example, the processor 804, and connected to the memory 805, to invoke the program in the memory 805 to perform the operations of the network-side device shown in the foregoing method embodiments.

The baseband apparatus 803 may further include a network interface 806, configured to exchange information with the radio frequency apparatus 802, where the interface is, for example, a common public radio interface (CPRI).

Specifically, the network-side device in this embodiment of the present application further includes instructions or a program stored in the memory 805 and capable of running on the processor 804. The processor 804 invokes the instructions or program in the memory 805 to perform the method performed by the modules shown in FIG. 5, with the same technical effects achieved. To avoid repetition, details are not described herein again.

An embodiment of this application further provides a readable storage medium, where the readable storage medium stores a program or instructions, and when the program or instructions are executed by a processor, the processes of the foregoing embodiments of the assistance information processing method or the assistance information sending method are implemented, with the same technical effects achieved. To avoid repetition, details are not described herein again.

The processor is the processor in the terminal 700 or the network-side device 800 in the foregoing embodiment. The readable storage medium includes a computer-readable storage medium such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions of a network-side device to implement the processes of the foregoing embodiment of the assistance information sending method, with the same technical effects achieved. To avoid repetition, details are not described herein again.

It should be understood that the chip mentioned in this embodiment of this application may also be referred to as a system-level chip, a system chip, a chip system, a system-on-chip, or the like.

It may be understood that the embodiments described in this disclosure may be implemented by hardware, software, firmware, middleware, microcode, or a combination thereof. For hardware implementation, a module, a unit, a sub-module, a sub-unit, or the like may be implemented in one or more application-specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this application, or a combination thereof.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such process, method, article, or apparatus. In absence of more constraints, an element defined by "including a . . . " does not exclude another same element in a process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially, or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a base station, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. An assistance information processing method, performed by a terminal and comprising:
    receiving physical cell identifier (PCI) range information, wherein the PCI range information comprises a PCI range and network information corresponding to the PCI range; and
    determining, based on the network information, a network corresponding to the PCI range; wherein
    the network information comprises a network index; and
    the determining, based on the network information, a network corresponding to the PCI range comprises:
    determining, based on a network identifier list of a reference cell and the network index, the network corresponding to the PCI range.

2. The method according to claim 1, wherein after the step of determining, based on the network information, a network corresponding to the PCI range, the method further comprises:
    in a case that a network corresponding to the network index is a network not supported by the reference cell, ignoring or discarding the PCI range information.

3. The method according to claim 1, wherein the reference cell is prescribed by a protocol or configured by a network-side device.

4. The method according to claim 3, wherein in a case that the reference cell is prescribed by a protocol, the reference cell is any one of the following:
    a cell receiving the PCI range information;
    a cell of a preset type; or
    a cell of a preset identifier.

5. The method according to claim 4, wherein the cell of the preset type is a primary cell or a primary secondary cell.

6. The method according to claim 4, wherein an identifier type of the preset identifier comprises cell identity, physical cell identifier, or cell global identifier.

7. The method according to claim 3, wherein in a case that the reference cell is configured by a network-side device, the PCI range information further comprises cell indication information, and the cell indication information is used for indicating the reference cell.

8. The method according to claim 7, wherein the cell indication information comprises any one of the following:
    cell identity information;
    physical cell identifier information;
    cell global identifier information; or
    cell type identifier information.

9. An assistance information sending method, performed by a network-side device and comprising:
    sending physical cell identifier (PCI) range information, wherein
    the PCI range information comprises a PCI range and network information corresponding to the PCI range, wherein the network information comprises a network index, to cause a terminal to determine a network corresponding to the PCI range based on a network identifier list of a reference cell and the network index.

10. The method according to claim 9, wherein in a case that the network corresponding to the PCI range is a network supported by a reference cell, the network information comprises the network index.

11. The method according to claim 9, wherein the reference cell is prescribed by a protocol or determined by the network-side device.

12. The method according to claim 11, wherein in a case that the reference cell is prescribed by a protocol, the reference cell is any one of the following:
    a cell receiving the PCI range information;
    a cell of a preset type; or
    a cell of a preset identifier.

13. The method according to claim 12, wherein the cell of the preset type is a primary cell or a primary secondary cell.

14. The method according to claim 12, wherein an identifier type of the preset identifier comprises cell identity, physical cell identifier, or cell global identifier.

15. The method according to claim 11, wherein in a case that the reference cell is determined by the network-side device, the PCI range information further comprises cell indication information, and the cell indication information is used for indicating the reference cell.

16. The method according to claim 15, wherein the cell indication information comprises any one of the following:
    cell identity information;
    physical cell identifier information;
    cell global identifier information; or
    cell type identifier information.

17. A terminal, comprising a memory, a processor, and a program stored in the memory and capable of running on the processor, wherein when the program is executed by the processor, steps of an assistance information processing method are implemented, the steps comprises:
    receiving physical cell identifier (PCI) range information, wherein the PCI range information comprises a PCI range and network information corresponding to the PCI range; and
    determining, based on the network information, a network corresponding to the PCI range; wherein
    the network information comprises a network index; and
    the determining, based on the network information, a network corresponding to the PCI range comprises:
    determining, based on a network identifier list of a reference cell and the network index, the network corresponding to the PCI range.

18. The terminal according to claim 17, wherein the reference cell is prescribed by a protocol, and the reference cell is any one of the following:
    a cell receiving the PCI range information;
    a cell of a preset type; or
    a cell of a preset identifier.

19. The terminal according to claim 17, the reference cell is configured by a network-side device, the PCI range information further comprises cell indication information, and the cell indication information is used for indicating the reference cell.

20. A network-side device, comprising a memory, a processor, and a program or instructions stored in the memory and capable of running on the processor, wherein when the program or instructions are executed by the processor, the steps of the assistance information sending method according to claim 9 are implemented.

* * * * *